Feb. 9, 1943.　　　　H. H. SNYDER　　　　2,310,469
SEVERING LENGTHS OF GLASSWARE
Filed June 9, 1942　　　3 Sheets-Sheet 1
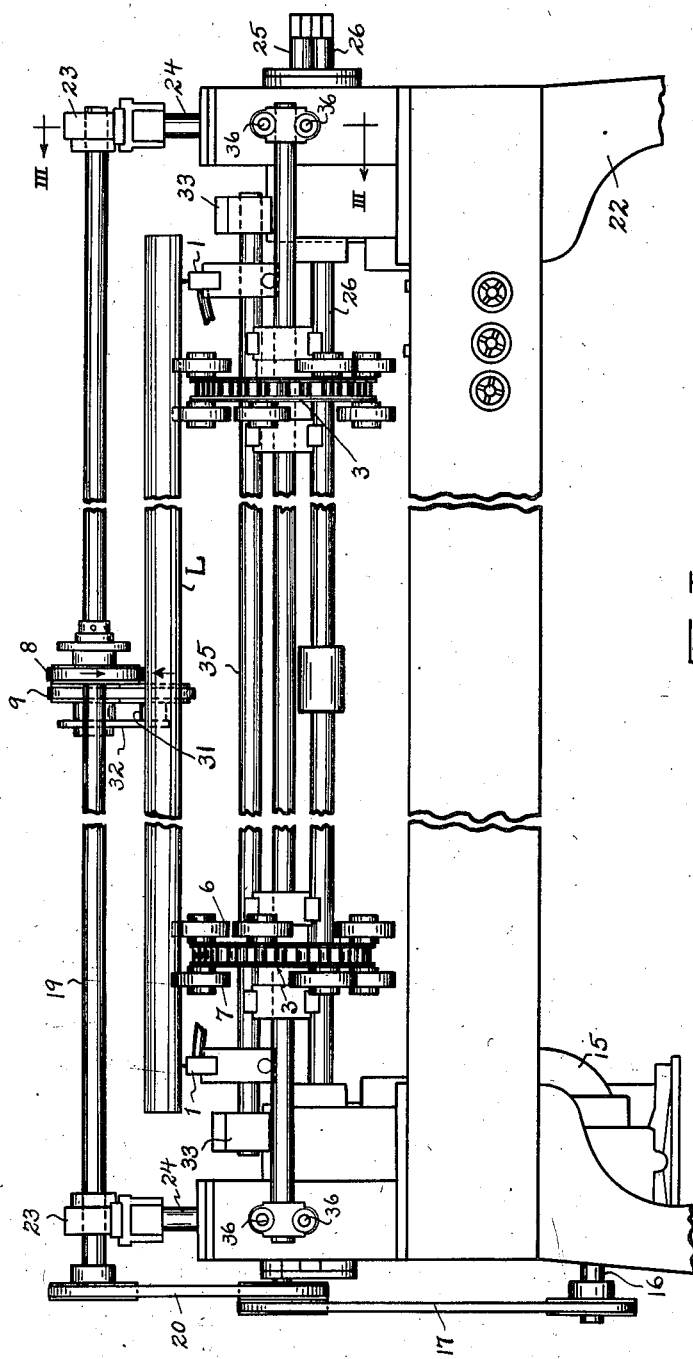
FIG. I.
INVENTOR
*Harold H. Snyder*
BY *Christy, Parmelee and Strickland*
ATTORNEYS

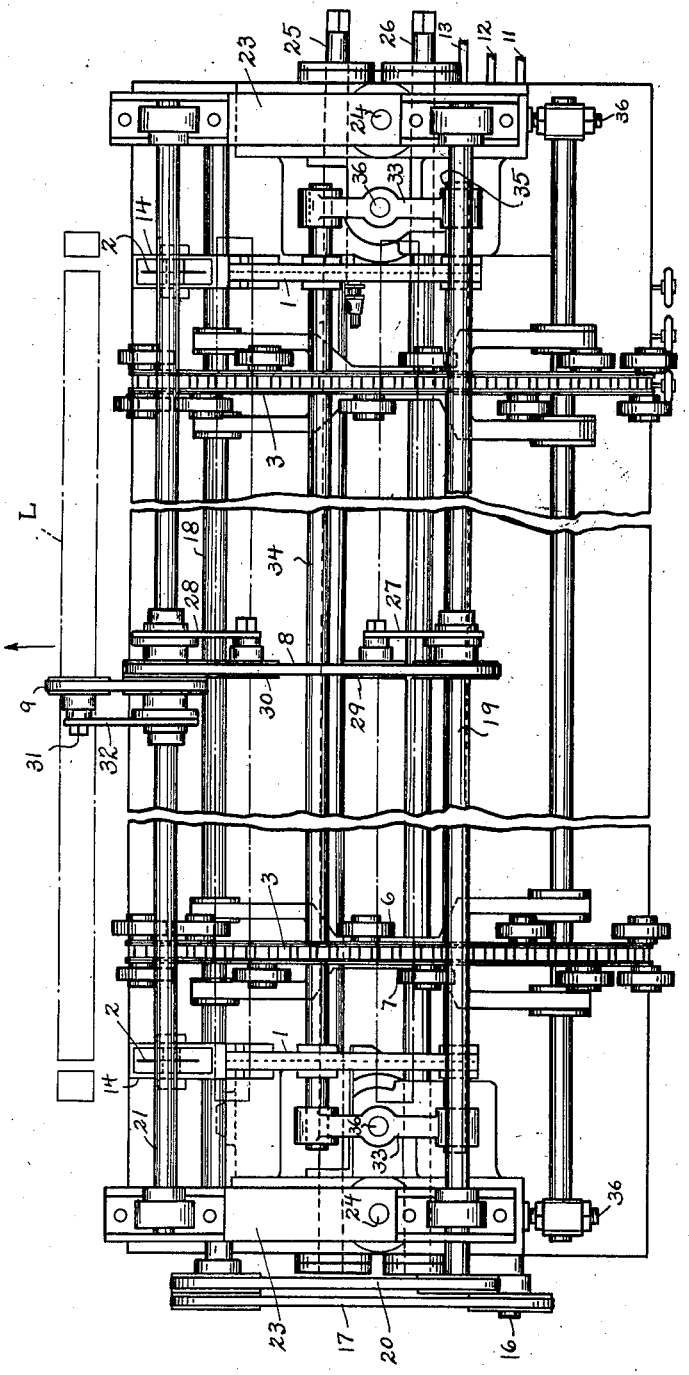

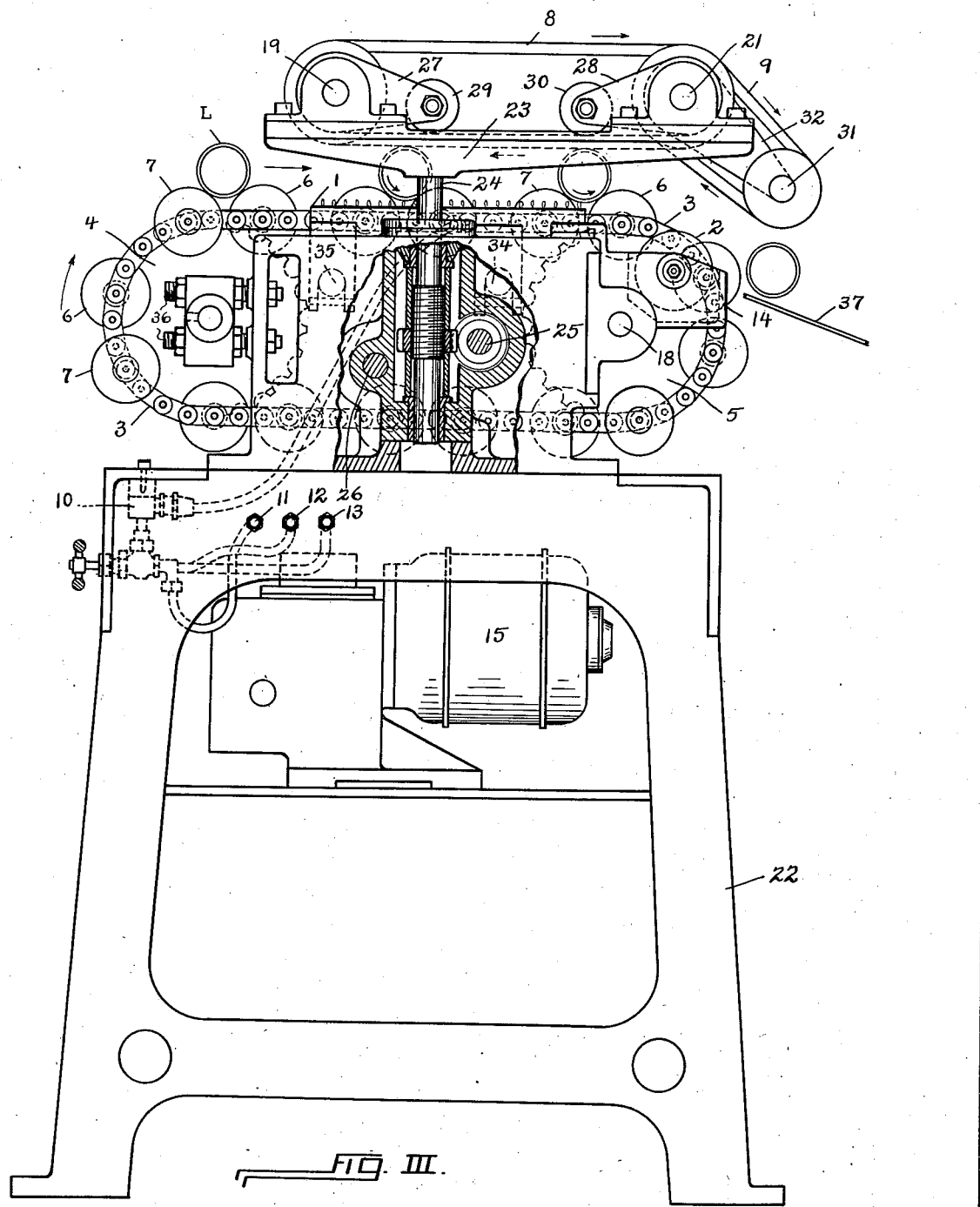
FIG. III.

Patented Feb. 9, 1943

2,310,469

UNITED STATES PATENT OFFICE 2,310,469

SEVERING LENGTHS OF GLASSWARE

Harold H. Snyder, Mount Lebanon, Pa., assignor to Forter-Teichmann Company, Pittsburgh, Pa., a corporation of Pennsylvania Application June 9, 1942, Serial No. 446,333

9 Claims. (Cl. 49—50)

This invention relates to the cutting of elongated articles of glass, such as rods and tubes; and finds practical application, both in the trimming to accurate dimension previously prepared lengths of such articles, and in the severing of previously prepared lengths one by one to a plurality of accurately dimensioned sections. Invention is found in refinements of machine structure, in consequence of which the work is performed with great accuracy, speed, and economy.

In the accompanying drawings Fig. I is a view in side elevation of the machine of the invention; Fig. II is a view in plan from above; and Fig. III is a view of the machine, partly in end elevation and partly in vertical section, on the plane indicated at III—III, Fig. I.

Cutting is effected by setting the length of tubing or of rod into rotation upon its axis; heating it locally in the region in which severing is to be effected; and causing the length, so locally heated, to come while in rotation to tangential bearing upon and to advance upon a relatively cold, sharp-edged disk of steel. As seen in the drawings, a length of work L (here shown to be a tube), set in rotation by means presently to be described, is heated locally and adjacent its two ends by advance over the lines of flames of burners 1, and in heated condition is advanced, while still in rotation, to tangential bearing from above upon idly and freely rotatable cold disks 2 (Figs. II and III); and severing is effected, as diagrammatically indicated in broken lines in the upper part of the view, Fig. II.

The means for supporting and advancing successive lengths of material to be cut, and for causing them to rotate axially as they advance, and to come while advance continues to firm bearing tangentially upon the severing disks are these:

Two endless chains 3, mounted upon and driven by sprocket wheels 4, 5, extend in parallel and side by side positions (properly spaced apart) through horizontally extending upper reaches. The chains carry pairs of disks 6, 7, adapted pair by pair to constitute upwardly flaring recesses in which the work may rest; and pairs of disks 6, 7, upon the two chains are aligned in the direction of the extent of the work, so that the pieces of work rest singly, each upon two pairs of disks 6, 7, as shown in Figs. I and III. It is advantageous that the disks 6, 7, be borne upon spindles that extend laterally from the chains, and that ball bearings be provided, to afford minimum resistance to the turning of the so supported work.

An endless and positively driven belt 8, whose lower reach extends horizontally above and at an accurately spaced interval above the upper reach of the disk-carrying chains 3, is engaged tangentially by the pieces of work as they advance through the upper reach of such chain conveyor (from left to right Fig. III), and the drive of the belt (advancing in right to left direction) then is effective to rotate the work (counter-clockwise, as seen in Fig. III) at a speed exceeding that at which, lacking the belt drive, the work might roll in contact upon a stationary overhanging surface. The belt is so arranged (as shown in Fig. III) as to be effective in rotating the work throughout a substantial part of the upper reach of the conveyor chains 3, and to the point where the chains round the sprocket wheels 5 to the right.

The belt effects rotation while the work advances above burners 1. The burners are alongate, and each delivers a line of flames. As here shown, there are two burners; their lines of flame extend in the direction of the advance of the work; they are spaced apart at an accurately determined (and adjustable) interval and adjacent the ends of the advancing lengths of work; and, as operation progresses, and as the rotating work progresses, playing upon the work, they effect the heating of circumferential bands within the longitudinal extent of the pieces of work.

The burners are fed from a manifold 10. This manifold is a mixing chamber, and to it, through connections 11 and 12, gas and air in suitable and properly proportioned quantities are fed. A third connection 13 is preferably provided, through which under proper control, a supply of oxygen may be fed. By such provision flames of adequate intensity may be delivered by the burners.

Comparing Fig. III with Figs. I and II, it will be seen that, while a relatively narrow belt 8, arranged medially with respect to the longitudinal extent of the work, suffices to effect the desired rotation, the two burners are arranged toward the ends and play upon terminal regions of the work, where severance is to be effected. The effect, then, of the apparatus thus far described is to bring successive lengths of work to the brink of descent, where the chains begin to round the sprocket-wheels 5, with band-like regions adjacent the two ends heated to high temperature.

A second endless and positively driven belt 9 is arranged to be engaged (in like manner as belt 8 is engaged) by the work in its descent, as the chains 3 begin to round the sprocket-wheels 5. The belt 9 is effective to continue the counterclockwise rotation of the lengths of work as they continue to advance from left to right and downwardly (Fig. III). In the course of progress of the work, while it is engaged by belt 9, it comes to tangency with the freely turning disks 2. The work advances upon the curved edges of these disks; it is held by the pressure exerted by the belt to tangency upon these curved edges and, as has been said, it continues in rotation, under the impulse of belt 9.

The disks are accurately placed and spaced apart; the regions of heating have been correspondingly located; and the effect of the rotation of the work against the freely turning sharp-edged disks 2 is a clean severance of the work on the planes of the circumferences traced by the disks upon the rotating work.

The disks 2, making no more than tangential contact with the work, do not take from it any considerable quantity of heat. Their essentially relatively low temperature is sufficiently maintained by providing small tanks 14 of water, in which the disks are partially submerged.

A motor 15, through driven shaft 16 and belt drive 17, effects rotation of the shaft 18 that carries the sprocket-wheels 5. The belt 8 is borne by a pair of pulley drums, and the belt driving drum is carried by shaft 19. This shaft, through belt 20, is rotated in simultaneity with the sprocket-wheel shaft 18. The belt 9 also is borne by a pair of pulley drums, and one drum of each of the said pairs is carried by the common shaft 21. Travel of belt 8 will by the instrumentalities described effect travel of belt 9; and the driving members are so proportioned that from the single motor 15 the chain conveyor and the work-rotating belts are driven at appropriate relative speeds.

The structure thus far described is mounted upon a suitable standard 22. A frame, that consists of beams 23, 23 and the shafts 19 and 21 rotatably mounted at their ends in these two beams, is borne by jack-screws 24, 24 that rise from the standard and engage immediately the beams 23. The jack-screws are rotated through worm gearing from a wrench-turned shaft 25; and by such means the spacing of belt 8 above the chain conveyor is varied, to make accommodation to the diameter of the work to be operated upon, and to adjust the spacing nicely, and afford work-rotating pressure of the belt upon the work of the desired degree of intensity.

Upon the shafts 19 and 21 arms 27 and 28 are pivotally borne. These arms at their distal ends carry rollers 29 and 30; and these arms resting by gravity (they might, if found advantageous, be spring-impelled) and from above upon the belt 8 in its work-engaging reach, cause the belt to afford augmented rotation-effecting pressure when engaged by the advancing work.

The drums that carry belt 9 are borne, one of them by the shaft 21, already described, and the other by a stub-shaft 31 rotatably borne by an arm 32, which arm 32 is pivotally borne upon shaft 21. As will be seen in Fig. III, the belt 9, so borne, is adapted to rest by the gravity of the organized structure upon the advancing work, and thus, allowing the work to advance upon the exposed limb of the curvature of disk 2, effects counterclockwise rotation of the work as it advances. (The arm 32, manifestly, might, if desired be spring-backed, to increase the effective pressure of the belt 9 upon the work.)

A frame that consists of beams 33, 33 and shafts 34 and 35 is borne upon jack-screws 36 (Fig. II) that rise from the standard and engage immediately the beams 33, 33; and, similarly as the belt-carrying frame already described is raised and lowered by the turning of the shaft 25, the frame last described is organized to be raised and lowered, by means of a second wrench-turned shaft 26. Upon the shafts 34, 35 rest saddlewise two unitary structures that include each one of the burners 1 and one of the disks 2, together with the associated disk-cooling tank 14 (cf. Fig. III). It is manifest that work of large diameter will be borne by the disks 6, 7 upon the chain conveyor with its nether surface at higher level than work of small diameter, and it is to meet this condition that burners and cooling disks are by the means described made adjustable vertically.

The unitary structures last characterized, that include each a burner and a severing disk so resting upon the shafts 34, 35, are adjustable longitudinally upon the shafts, to the end that their spacing apart may be minutely adjusted and accuracy may be gained in length of the product. The drawings show two such units organized in the machine. Manifestly three or more such units might be employed, so resting upon the shafts 34, 35, and these, accurately spaced, would render the machine effective to sever each advancing piece of work into two or more sections of accurately predetermined length.

In Fig. III illustration is given of adjustment bolts 36, by means of which the shaft that carries the sprocket wheels 4 may be adjusted in its mounting and the chains drawn taut.

In operation, lengths of work approximating but somewhat exceeding the trimmed and finished length are brought one by one to rest (at the left, Fig. III) in the seats formed by aligned pairs of disks 6, 7 borne by the two chains. Their advance upon the conveyor and the engagement of them by the traveling belt 8, cause them to rotate. As they rotate they are subject to the heating effect of the underlying burners 1, and they are heated at appropriate regions in their longitudinal extent and throughout circumferential belts or bands. When so locally heated they come, in their further advance and while subject to the restraining pressure and the rotative effect of belt 9, to tangency upon the disks 2, and, while so making tangency, they are advanced over and are positively rotated upon the circumferences of the sharp-edged and relatively cold disks. The consequence and effect are that clean and accurate cleavage is effected in the planes of the circumferences that the disks follow in their tangency upon the work. And by the means described the spacing of the planes of cleavage is accurately predetermined.

The trimmed blank, passing beyond the disk 2 (to the right, Fig. III) escapes by gravity to an appropriate receiver 37.

I claim as my invention:

1. In apparatus for trimming cylindrical lengths of glass that includes a burner adapted to deliver a line of flames, means for rotating and for advancing as it rotates a length of glass along and beyond the end of such line of flame, and means for severing the length of glass in its advance beyond the end of such line of flame, the invention herein described which consists in a traveling work support for advancing the length of glass and an overhanging work-rotating member adapted to be engaged from beneath by the advancing work and constituting the work-rotating means, the burner being arranged beneath the path of the advancing and rotating work.

2. The structure of claim 1, the work support consisting in a chain-conveyor equipped with pairs of idly turning disks, and the overhanging member consisting in an endless positively driven belt.

3. The structure of claim 1, the work support consisting in a sprocket-driven endless chain conveyor with upper horizontal reach continued in a descending curve, and the overhanging member consisting in two endless positively driven belts cooperating severally with the conveyor or its horizontal reach and in the descending curvilinear portion of its path of advance.

4. The structure of claim 1, the work support consisting in a chain-conveyor equipped with pairs of idly turning disks, the overhanging member consisting in an endless positively driven belt, the said belt being adjustable in its spacing from the conveyor.

5. In apparatus for trimming cylindrical lengths of glass the combination of an endless conveyor equipped with pairs of idly rotatable work-supporting disks, work-rotating means including a work-rotating member overhanging said conveyor and adapted to be engaged by work resting upon and advanced by said conveyor, and a plurality of units, each including a heater and a glass-severing disk, arranged beneath the path of advance of the work upon the conveyor and adjustable unit by unit transversely of the direction of conveyor advance.

6. In apparatus for trimming cylindrical lengths of glass the combination of an endless conveyor equipped with pairs of idly rotatable work-supporting disks, work-rotating means including a work-rotating member extending parallel to said conveyor and adapted to be engaged by work resting upon and advanced by said conveyor, a heater extending adjacent to the path of advance of the work upon the conveyor, and a glass-severing disk arranged adjacent said path of advance in position adjacent the said heater.

7. The structure of claim 6, the work-rotating member consisting in an endless positively driven belt borne by a frame, and means for adjusting the frame relatively to the work-supporting conveyor.

8. The structure of claim 6, the heater and the glass-severing disk borne by a frame, and means for adjusting the frame relatively to the work-supporting conveyor.

9. The structure of claim 6, the work-rotating member consisting in an endless positively driven belt borne by a frame, and means for adjusting the frame relatively to the work-supporting conveyor, the heater and the glass-severing disk borne by a second frame, and means for adjusting such second frame relatively to the work-supporting conveyor.

HAROLD H. SNYDER.